United States Patent [19]

Miwa et al.

[11] Patent Number: 4,595,285
[45] Date of Patent: Jun. 17, 1986

[54] TRANSLUCENT DOCUMENT COVER FOR USE IN ELECTROPHOTOGRAPHIC COPYING MACHINE

[75] Inventors: Yoshihisa Miwa; Haruyoshi Migita, both of Nara, Japan

[73] Assignee: Sharp Kabushiki Kaisha, Osaka, Japan

[21] Appl. No.: 673,735

[22] Filed: Nov. 21, 1984

[30] Foreign Application Priority Data

Nov. 24, 1983 [JP] Japan .................................. 58-222389
Nov. 24, 1983 [JP] Japan .................................. 58-222392

[51] Int. Cl.⁴ .................... G03B 27/62; G03B 27/52
[52] U.S. Cl. ........................................... 355/75; 355/61
[58] Field of Search .................... 355/75, 59, 61, 44

[56] References Cited

U.S. PATENT DOCUMENTS 3,957,370   5/1976   Vola ................................. 355/75 X
4,436,402   3/1984   Seimiya et al. .................... 355/75 X Primary Examiner—Richard A. Wintercorn
Attorney, Agent, or Firm—Birch, Stewart, Kolasch & Birch

[57] ABSTRACT

A translucent document cover for an electrophotographic copying machine is provided for pressing a copy document onto a document table. For example, it comprises a combination of a first film which is white and translucent, and a second film which is transparent. Preferably, it has an opacity of about 80-85%. The translucent document cover has some line indexes for indicating the accurate positioning of the copy document. Further, the document cover may be provided with marks for indicating ratios of magnifying/reducing the copy document.

6 Claims, 5 Drawing Figures

TRANSLUCENT DOCUMENT COVER FOR USE IN ELECTROPHOTOGRAPHIC COPYING MACHINE

BACKGROUND OF THE INVENTION

The present invention relates to an electrophotographic copying machine and, more particularly, to a translucent document cover for pressing a document to be copied by an electrophotographic copying machine.

A document such as a manuscript or book to be copied by an electrophotographic copying machine is disposed on a transparent plate. The document is optically scanned to produce onto a photoreceptor an electrostatic latent image corresponding to an image of the document. To closely press the document onto the transparent plate, a document cover is conventionally provided. Since the document cover is not translucent or transparent, it may be difficult to see whether the document has been properly disposed on the plate or how much the document size is, when the cover is placed over the document.

SUMMARY OF THE INVENTION

Accordingly, it is an object of the present invention to provide an improved electrophotographic copying machine on which a copy document can be placed without regard to position and size.

It another object of the present invention to provide an improved translucent document cover for an electrophotographic copying machine for monitoring the positioning and the size of a copy document placed on a document plate, after the document cover has covered the copy document.

It is a further object of the present invention to provide an improved translucent document cover for an electrophotographic copying machine, the document cover being equipped with paper size indexes for some paper sizes.

Briefly described, in accordance with the present invention, a translucent document cover is provided for pressing a copy document onto a transparent table or an electrophotographic copying machine. For example, the translucent document cover comprises a combination of a first film which is white and translucent, and a second film which is transparent. Preferably, it has an opacity of about 80-85%. The translucent document cover has some line indexes for indicating the accurate positioning of the copy document. Further, the cover may be provided with marks for indicating ratios for magnifying/reducing the copy document.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
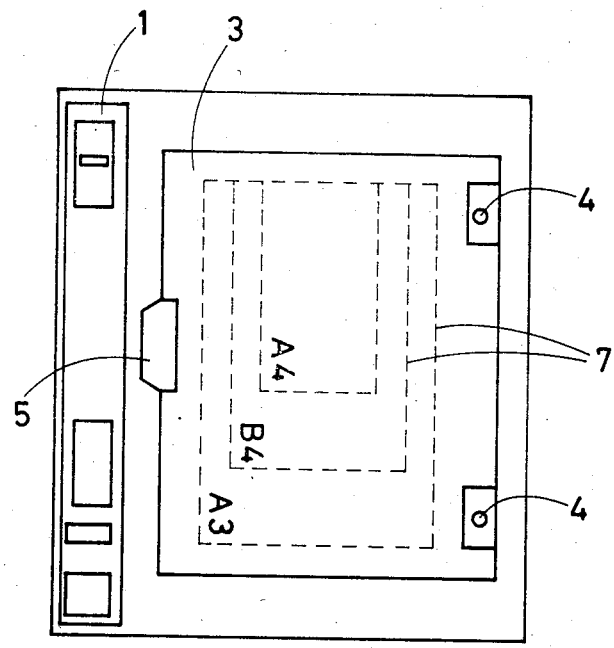
FIG. 1 is a plan view of an electrophotographic copying machine including a translucent document cover according to a first preferred embodiment of the present invention.
Figure 2:
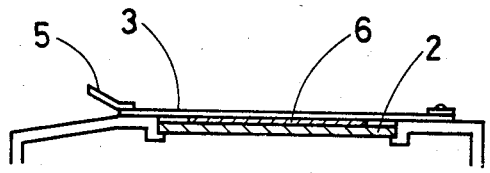
FIG. 2 shows a side view of upper portions of the copying machine including the translucent document cover of FIG. 1.

FIG. 1 is a plan view of an electrophotographic copying machine including a translucent document cover according to a first preferred embodiment of the present invention. FIG. 2 is a side view of upper portions of the copying machine including the translucent document cover.

Referring to FIGS. 1 and 2, there are provided a control unit 1, a glass plate 2, a translucent document cover 3, some supporting portions 4, and a handle 5.

The control unit 1 includes some switches actuated for mode selection to enable the copying operation in the copying machine. The glass plate 2 is positioned at the upper portions of the copying machine to receive a copy document thereon. The translucent document cover 3 is provided for covering and pressing the copy document 6 on the glass plate 3. The translucent document cover 3 is supported by the supporting portions 4 so that it can be pivotally rotated. The handle 5 is gripped to lift the translucent document cover 3 upward.

According to the main feature of the present invention, the document cover 3 is white and translucent, so that the operator can see and monitor the copy document 6 through the translucent document cover 3 when the cover 3 is placed on the document 6. As shown in FIG. 1, the translucent document cover 3 has some index lines 7 to indicate both a copy size outline and an accurate position of positioning the document 6 on the glass plate 2.

Even when the translucent document cover 3 has covered the document 6 on the glass plate 2, it can be detected through the document cover 3 whether the document 6 is properly mounted along the index lines 7. Further, the copy size can be detected in terms of marks "A4", "B4", and "A3". This can prevent missselection of the copy paper.

Figure 3:
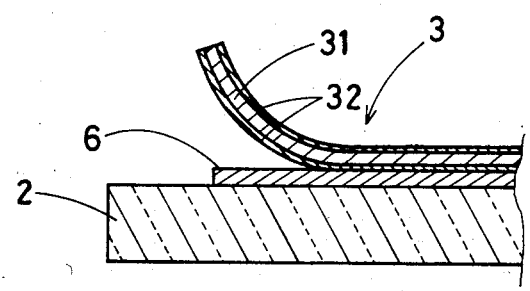
FIG. 3 is an enlarged side view of the upper portions of FIG. 2.

FIG. 3 is an enlarged side view of the upper portions of the copying machine.

For example, the translucent document cover 3 comprise a white translucent soft film made of vinyl chloride sandwiched by a pair of thin transparent films 32 made of polyethylene terephthalate. Although FIG. 3 shows a three-layered film, it may be possible that the cover 3 is a single layer film or a two-layered film comprising a soft translucent film made of vinyl chloride facing the copy document 6 and a transparent film combined for strengthening. To provide the flexibility of the document cover 3, the transparent film combined with the soft film made of vinyl chloride should be selected to be flexible. To provide rigidity of the cover 3, the transparent film to overlay the soft film 31 should be rigid.

Preferably, the white, translucent film has an opacity of about 80-85%. If the opacity is too low, some part of the light from a copy lamp scanning the document 6 can pass through the document cover 3, so that the reflected light may be reduced. Therefore, disadvantageously, a dark image may be copied around the paper due to the document cover 3. On the contrary, when the opacity is too high, the document 6 will not be viewed through the cover 3. It has been determined that a range of 80–85% causes no problem.

Figure 4:
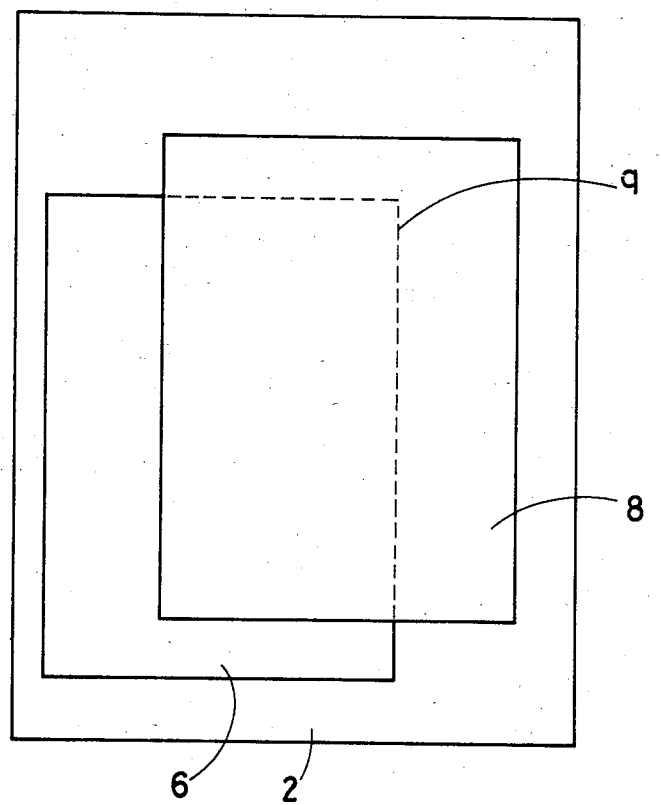
FIG. 4 is a plan view of a document table of FIG. 1.

In particular, the opacity of ordinary copy paper is about 80–85%. Therefore, when such a copy paper 8 is overlayed on the copy document 6 as shown in FIG. 4, the periphery 9 of the copy document 6 can be viewed through the copy paper 8. In place of the document cover 3, the copy paper 8 can be overlayed on the document 6 to copy it, in which the same effect as overlaying the document cover 3 on the document 6 can be expected. Thus, with the help of the white and translucent document cover 3 having the same opacity as ordinary copy paper, no problem of copying occurs and monitoring of the copy document 6 is possible.

To provide the white and translucent material for the document cover, other than the opacity degree, heat resistivity, weatherability (white color stability), and durability should be considered. Depending on the type of light source for the copying machine, the material of the white and translucent film may be altered to be selected from the material of polyethylene terephthalate, a propylene synthetic rubber, and a chlorosulfonated polyethylene (CSM) synthetic rubber so as to have an opacity of about 80–85%.

Figure 5:
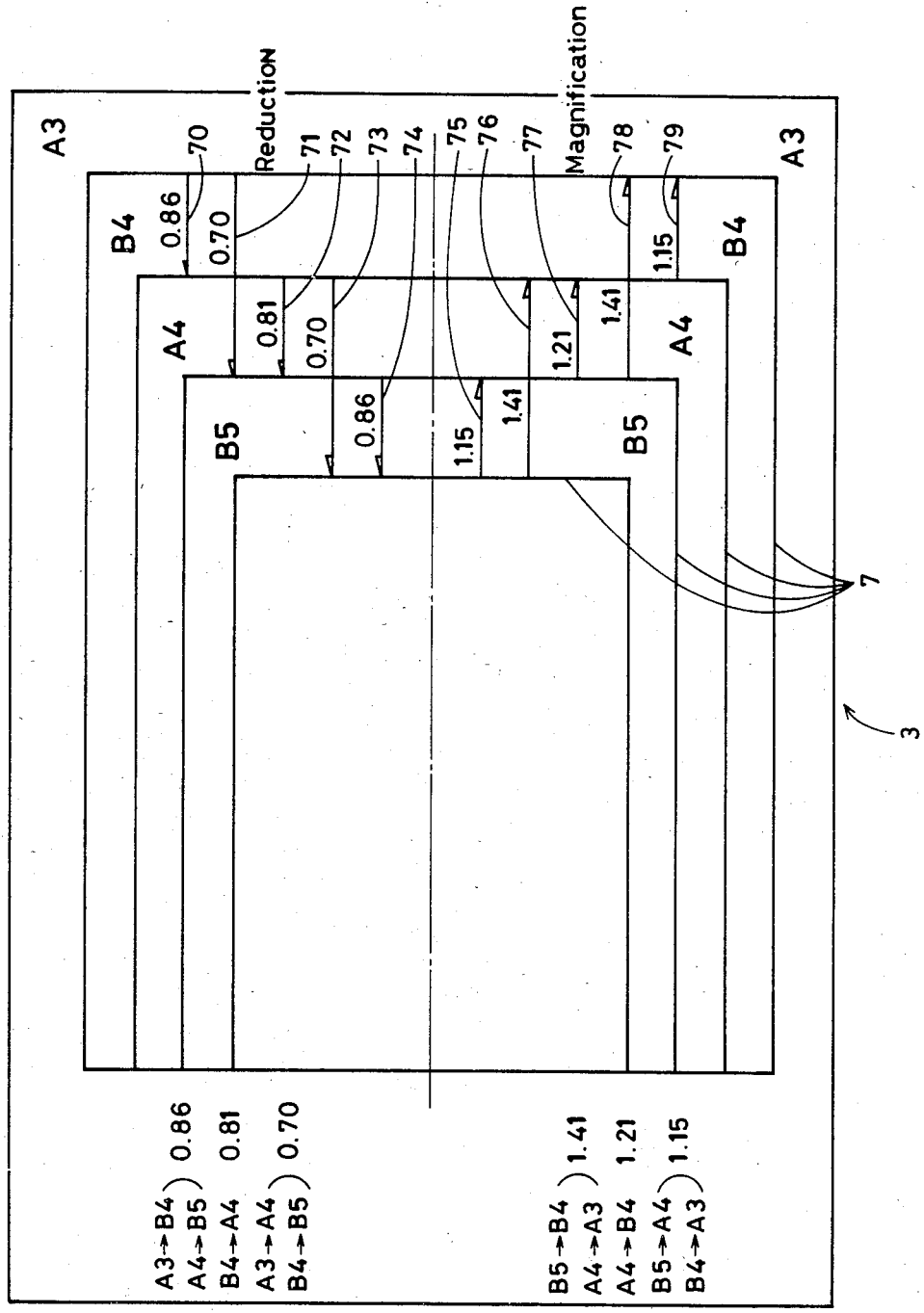
FIG. 5 is a plan view of the translucent document cover according to a second preferred embodiment of the present invention.

FIG. 5 is a plan view of the translucent document cover according to a second preferred embodiment of the present invention.

As stated in connection with FIG. 1, the translucent document cover 3 is provided with index lines 7 to indicate the necessary document positioning and the document size outlines. In particular, in the second preferred embodiment of the present invention, the possible image size ratios for magnification and reduction are marked. The reduction size ratios are arranged at the upper positions of FIG. 5 while the magnification size ratios are arranged at the lower positions thereof. The respective magnification or reduction ratios are provided for correlating copied-image sizes as follows:

Marks 70 and 74: a reduction of 0.86 time to reduce A3 and A4 sizes to B4 and B5 sizes, respectively Marks 71 and 73: a reduction of 0.70 time to reduce A3 and B4 sizes to A4 and B5 sizes, respectively Mark 72: a reduction of 0.81 time to reduce B4 size to A4 size Marks 75 and 79: a magnification of 1.15 times to magnify B5 and B4 sizes to A4 and A3 sizes, respectively Marks 76 and 78: a magnification of 1.41 times to magnify B5 and A4 sizes to B4 and A3 sizes, respectively Mark 77: a magnification of 1.21 times to magnify A4 size to A3 size When the copy document is to be copied as that of being life-size, the copy paper having a largeness as the document size is selected with the help of the index lines 7. For the magnification or the reduction, the magnification/reduction marks 70–79 can assist copy paper selection. The magnification/reduction scales can be directly detected visually, so that paper selection becomes easier. For example, when A3 copy document is to be reduced into A4 size, the reduction ratio of 0.70 can be recognized and selected by the mark 71 from the index line 7 indicating A3 size to the index line 7 indicating A4 size. When A3 copy document is to be copied and reduced 0.86 time, it can be detected at once that B4 size copy papers should be selected on account of the mark 70. Thus, selecting the copy papers can be assisted.

As stated above, according to the present invention, the accurate positioning and the size of the copy document can be monitored through the translucent document cover after it covers the copy document. Owing to the index lines and the marks labeled on the translucent document cover, the copy size and the magnification/reduction ratio can be recognized easily.

While only certain embodiments of the present invention have been described, it will be apparent to those skilled in the art that various changes and modifications may be made therein without departing from the spirit and scope of the present invention as claimed.

What is claimed is:

1. An electrophotographic copying machine comprising:
    table means on which a copy document is to be placed for copying; and
    translucent cover means for covering and pressing the copy document onto said table means, said cover means having a opacity of from about 80–85%.

2. The electrophotographic copying machine of claim 1, wherein said cover means for pressing a copy document onto a transparent table comprises:
    a first film which is white and translucent; and
    a second transparent film overlayed on said first film.

3. The electrophotographic copying machine of claim 1, wherein said translucent cover means comprises a white, translucent film sandwiched between two transparent films.

4. The electrophotographic copying machine of claim 1, wherein said cover is provided with index lines for indicating the accurate positioning of said copy document.

5. The electrophotographic copying machine of claim 4, wherein said cover is further provided with mark means for indicating a ratio for magnifying/reducing the copy document.

6. The electrophotographic copying machine of claim 2, wherein said first film is made of vinyl chloride and the material of said second film is selected from the group consisting of polyethylene terephthalate, propylene, and chlorosulfonated polyethylene.

* * * * *